United States Patent Office 3,432,465
Patented Mar. 11, 1969

3,432,465
POLYFUNCTIONAL EPOXIDES AND THEIR POLYMERS
William De Acetis, Berkeley, and Edgar J. Smutny, San Francisco, Calif., assignors to Shell Oil Company, New York, N.Y., a corporation of Delaware
No Drawing. Filed May 14, 1965, Ser. No. 456,001
U.S. Cl. 260—47          9 Claims
Int. Cl. C07d *1/18;* C08f *7/12;* C08g *30/00*

ABSTRACT OF THE DISCLOSURE

Novel epoxides are disclosed. These novel epoxides have the general formula $$R-[O-CH_2-A-(CH_2)_3-B]_n$$

wherein R is the residue obtained by removing one or more OH— groups from a phenol, each A is

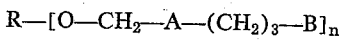

each B is

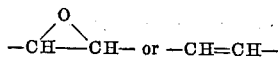

with at least one of the groups A or B being an epoxy group and $n$ is an integer from 1 to 4.

---

This invention relates to novel epoxides. More particularly the invention relates to a new class of epoxides having a plurality of polymerizable groups and the resin products obtained therefrom.

It is known that liquid polyepoxides derived from polyhydric phenols, such as diglycidyl ethers of 2,2-bis(4-hydroxyphenyl)propane are useful in the preparation of castings and coating compositions. The use of these materials however has been limited due to their high viscosities. It has been possible in some cases to reduce the viscosity by the addition of reactive diluents, such as n-butyl glycidyl ether, but the addition of such materials generally causes a loss in some of the desired properties of the cured system. Further, the known liquid polyepoxides derived from the polyhydric phenols are not as reactive with curing agents, such as aromatic polyamines, as would be desirable for many applications. In addition, these known polyepoxides fail to give the degree of hardness, particularly at elevated temperatures, required for many commercial applications. Further, such polyepoxides have been rather difficult and expensive to manufacture commercially.

It is an object of the invention to provide a new class of epoxy compounds and a method for their preparation. It is a further object of the invention to provide a new class of epoxy compounds having a very high degree of functionality without having an unduly high molecular weight or viscosity. It is another object to provide new phenolic polyepoxides that can be cured to form hard castings having high heat resistance and resistance to solvents and water. These and other objects and advantages will be apparent from the following description of the invention.

The novel epoxides of the invention have the general formula (I)        $R-[O-CH_2-A-(CH_2)_3-B]_n$ wherein R is the residue of an organic compound selected from phenols, aliphatic alcohols and carboxylic acids, each A is independently selected from

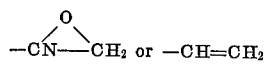

and each B is independently selected from

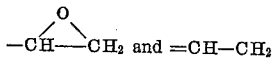

with at least one of the groups A or B being an epoxy group and $n$ is an integer from 1 to 4 and preferably from 1 to 2 corresponding to the number of hydroxy groups or acid groups of the original compound.

The above-described epoxy compounds are prepared by treating a phenoxy octadiene, an aliphatic octadienyl ether or a octadienyl carboxylate with an epoxidizing agent. These octadienyl compounds are prepared by reacting a phenol, aliphatic alcohol or carboxylic acid with butadiene in the presence of certain transition metal compounds such as palladium dichloride as described in copending applications Ser. No. 455,965, filed May 14, 1965 now abandoned; Ser. No. 456,000, filed May 14, 1965, now abandoned; Ser. No. 455,978, filed May 14, 1965, the pertinent portions thereof being incorporated herein by reference.

Especially preferred epoxides of the invention are those wherein R in Formula I above is the residue of a monohydric or polyhydric phenol i.e., those derived from a phenoxy octadiene. Suitable phenols used in the preparation of the phenoxy octadienes are monohydric and polyhydric phenols of from 6 to about 24 carbon atoms. The polyhydric phenols may contain from 2 to 4 hydroxyl groups. The phenols may be unsubstituted, that is contain no substituents other than hydrogen or hydroxyl on the aromatic ring(s) or may ber ing substituted with substituents such as halogens, preferably chlorine or bromine, alkyl, alkoxy, aryloxy, haloalkyl, dialkylamino, etc. The polynuclear phenols may be those wherein the aromatic rings are fused, are directly attached by carbon-carbon bonds between ring carbon atoms or are connected by an alkylene, sulfide, sulfoxide, sulfone or phosphine bridge between the aromatic rings.

Suitable phenols used in preparation of the phenoxy octadienes include mononuclear phenols, such as phenol, p-chlorophenol, o-, m-, and p-cresol, p-methoxyphenol, 2,4-dichlorophenol, 2,6-dimethylphenol, etc., catechol, resorcinol, hydroquinone, methyl resorcinol, pyrogallol, phloroglucinol, and polynulear phenols such as α-naphthol, 1,4 - dihydroxynaphthalene, 4-chloro-1,8-dihydroxynaphthalene, etc., 4,4'-dihydroxybiphenyl, 2,4'-dihydroxybiphenyl, 2,2'-dichloro-4,4'-dihydroxybiphenyl, etc., dihydroxyphenyl sulfide, dihydroxyphenyl sulfoxide, dihydroxyphenyl sulfone, dihydroxyphenyl phosphine, bis-(4-hydroxyphenyl)methane, bis-(4-hydroxyphenyl)ethane, 2,2 - bis(4 - hydroxyphenyl)propane, 2,2 - bis(4-hydroxyphenyl)butane, etc., 2,4-bis(2-hydroxybenzyl)phenol, 2,4-bis(4 - hydroxybenzyl)phenol, 2,6 - bis(2-hydroxybenzyl)phenol, 2,6-bis(4-hydroxybenzyl)phenol, 2-(2-hydroxybenzyl) - 4 - (4-hydroxybenzyl)phenol, 2-(4-hydroxybenzyl)-4-(2-hydroxybenzyl)phenol, 2-(2-hydroxybenzyl)-6-(4 - hydroxybenzyl)phenol, 1,1,2,2-tetrakis(hydroxyphenyl)ethane and the like. The resulting ethers of the butadiene-phenol reaction are characterized by the formula $$R-[O-CH_2-CH=CH-(CH_2)_3-CH=CH_2]_{1-4}$$

wherein R is as described above.

Preferred phenols used to prepare the epoxides of the invention are the monohydric and dihydric phenols. Especially preferred are those epoxides prepared from dihydroxydiphenyl alkanes, the alkylene bridge containing from 1 to 4 carbon atoms.

In preparing the epoxides, any of the known epoxidizing agents may be used, for example, peracetic acid, perbenzoic acid, monoperphthalic acid, etc. The amount of epoxidizing agent used may be varied depending on the degree of epoxidation desired. For each ethylenic group to be epoxidized it is necessary to use at least one mole

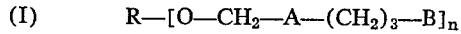

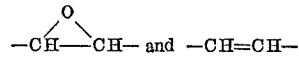

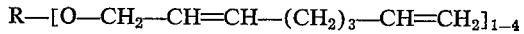

of epoxidizing agent per mole of the octadienyl compound.

It is preferred to carry out the epoxidation reaction in a suitable mutual solvent for the reactants and product. Chloroform is an especially useful solvent for this purpose, but other materials such as ethyl ether, dichloromethane, benzene, ethyl aceate, etc., and the like, may be used. It is not necessary to operate under anhydrous conditions, but the amount of water present should be limited so as to avoid excessive hydrolysis of the epoxy groups. Up to about 25% water in the reaction mixture may be tolerated.

The temperature employed during the epoxidation may vary over a considerable range depending upon the oxidizing agent selected. It is generally desirable to maintain the temperature between 0° C. to 60° C. and more preferably between 0° C. and 40° C. Atmospheric, superatmospheric or subatmospheric pressures may be employed as desired.

The epoxidized products obtained by this method may be recovered from the reaction mixture by any convenient means known to the art, such as distillation, extraction fractional precipitation, filtration and the like.

As set forth above, the epoxides of this invention may contain ethylenically unsaturated linkages and epoxy group(s) and thus may be polymerized by reaction of either of these polymerizable groups to form valuable resin products. Polymerization through the ethylenic linkages produces linear chains of carbon atoms while polymerization through the epoxy groups forms linear chains of carbon atoms connected by intermediate oxygen atoms. It is therefore possible to form from these epoxides products which are composed of substituted ethylene groups, substituted oxyalkylene groups, or which are composed of any intermediate mixture of the two types of structural units by varying the reaction conditions to favor the polymerization of one or the other or both polymerizable groups.

Increasing the reaction temperature increases the rate of both the oxy-polymerization reaction (polymerization of the epoxide groups) and the carbo-polymerization reaction (the polymerization of the unsaturated linkages). At a given elevated temperature in the presence of acidic, basic, or neutral epoxy curing agents, the oxy-polymerization reaction predominates. In the absence of the above materials and in the presence of carbo-polymerization catalysts such as organic peroxides, perborates, persulfates, actinic light, oxygen, Ziegler catalysts and the like, the carbo-polymerization reaction predominates.

A preferred method of producing predominately carbon-to-carbon linked polymers comprises the oxygen catalysed polymerization of the unsaturated epoxides at temperatures between about 50° C. and 300° C. A particularly economical means of accomplishing the reaction comprises maintaining the epoxide (in the absence of the oxy-polymerization reaction catalysts mentioned above) at between about 50° to 200° or at the reflux temperature of the epoxide under atmospheric pressure, while aerating it with oxygen, which is most conveniently and economically introduced in the form of normal air. Where it is practical or desirable to employ higher temperatures the reaction may be conducted in greater than atmospheric pressure systems with or without continuous introduction of oxygen or other carbo-polymerizaiton catalysts.

Alternatively, predominately carbon-to-carbon linked polymers may be produced by polymerizing the above defined epoxides at temperatures between about 50° C. and 300° C. in the presence of an organic peroxide. Diacyl or dialkyl peroxides as well as acyl or alkyl hydroperoxides, peresters, diperoxides and the like may suitably be employed. In such employment peroxides in which the peroxide oxygen atoms are directly attached to one or more tertiary-alkyl radicals are particularly advantageous by virtue of their relative stability to impact and to the conditions of storage and handling in general. The amount of peroxide required for the polymerization reactions may be varied over relatively wide limits, but in general increasing the amount of organic peroxide above about 5% based on the weight of the epoxide becomes relatively uneconomical. Illustrative examples of organic peroxides suitable for employment in the process include, ditertiary-butyl peroxide, di-tertiary-amyl peroxide, tertiary-butyl tertiary-amyl peroxide, tertiary-butyl hydroperoxide, benzoyl peroxide, 2,2'-bis(tertiary-butyl-peroxy) propane, tertiary-amyl hydroperoxide, acetyl peroxide, acetone peroxide, methyl n-propyl butane peroxide, dicyclohexyl peroxide and the like.

The polymers prepared in the above manner in the presence of the carbo-polymerization catalysts and in the absence of the oxypolymerization catalysts have a relatively high solubility and are fusible. These properties may be greatly modified by the application of conditions favoring oxy-polymerization either during the polymerization reaction or before or after applying, or molding the composition for its desired application.

In polymerizing through the ethylenic linkages as set forth above, in order that the resulting polymers will contain as many unchanged epoxy groups as possible, it is essential that the ether be polymerized in the presence of an oxyyen-yielding peroxy catalyst that is non-acid engendering since liberated acid may react with epoxy groups. Reference is made to preferred use of such catalysts as tertiary alkyl hydroperoxides such as tertiary butyl hydroperoxide, di(tertiary alkyl)peroxides such as di(tertiary butyl)peroxide and the like. About 0.1 to 10% by weight of the peroxides are used in effecting polymerization therewith. These epoxy containing polymers may then be cured to form hard, infusible resins by cross-linking of the molecules through the reactive epoxy groups.

It is a special embodiment of the invention to provide novel tetraepoxides of the formula

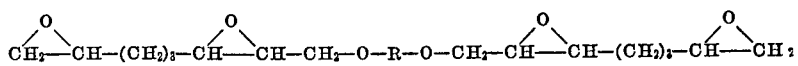

wherein R is the residue of a dihydric phenol and especially tetraepoxides where R represents

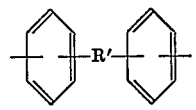

and R' a lower alkyl of from 1 to 4 carbon atoms.

The novel tetraepoxides by virtue of their plurality of the epoxy groups have high functionality without a corresponding undue increase in molecular weight thereby providing polyepoxides having relatively low molecular weight and viscosities. These novel tetraepoxides also offer the advantage of being easily cured under either acidic or basic conditions by virtue of the internal epoxy groups which are more rapidly under acid cure conditions and the external epoxy groups which cure more rapidly under basic conditions. Thus, these epoxides offer a greater latitude in production techniques in preparing polymers thereof as compared with conventional polyepoxides.

The epoxy containing monomers and the ethylenically polymerized epoxy containing polymers as set forth above may be cross-linked or cured in the presence of the well known epoxy curing agents to form highly cross-linked resins which because of their hardness and resistance to chemical attack may be used for a variety of purposes. Typical epoxy curing agents which may be used include, among others, carboxylic acids or anhydrides, such as phthalic anhydride, tetrahydrophthalic anhydride, Nadic methyl anhydride, chlorendic anhydride, pyromellitic anhyride, trimellitic anhydride, succinic anhydride, maleic anhydride, octadecenylsuccinic anhydride, etc., and mixtures thereof; dimer or trimer acids derived from unsaturated faty acids such as 1,20-eicosanedioic acid; Friedel-Crafts metal halides such as, for example, aluminum chloride, zinc chloride, ferric chloride, boron trifluoride, as well as complexes thereof with ethers, acid anhydrides, ketones, diazonium salts, and those disclosed in U.S. 2,824,083; salts such as zinc fluoborate, magnesium perchlorate, zinc fluosilicate; phosphoric acid and partial esters thereof including n-butyl orthophosphate, diethyl orthophosphate, hexaethyltetraphosphate, etc.; aliphatic cycloaliphatic, aromatic and heterocyclic amines such as diethylene triamine, triethylene tetramine, tetraethylene pentamine, dicyandiamide, melamine, pyridine, cyclohexylamine, benzyldimethylamine, benzylamine, diethylaniline, triethanolamine, piperidine, tetramethylpiperazine, N,N-dibutyl-1,3-propane diamine, 1,2-diamino-2-methylpropane, dibutyl amine, dioctylamine, dinonylamine, distearylamine, diallylamine, pyrrolidine, tetrahydropyridine, ortho, meta and para-phenylene diamine, diaminodiphenylmethane, p,p'-aminodiphenylsulfone, triaminobenzene, methylene dianiline, diaminotoluene, diaminodiphenyl, diaminostilbene, 1-3-diamino-4-isopropylbenzene, benzenetriamine, and soluble adducts of amines and polyepoxides and their salts as described in U.S. 2,651,589 and U.S. 2,640,037 and amino-amides obtained by reacting polybasic acids with polyamines as described in U.S. 2,450,940 and 2,695,908.

Preferred curing agents are the polycarboxylic acids and their anhydrides, the primary and secondary amines and polyamines and their epoxide adducts.

The particular amount of curing agent used is dependent on the nature of the curing agent. More specifically the tertiary amines and $BF_3$ complexes are preferably employed in amounts of from about 0.5% to 20% by weight of the epoxide and the metal salts are preferably employed in amounts of from about 1% to 15%. The primary and secondary amines, acids and anhydrides are preferably employed in an amount sufficient to provide from 0.6:1 to 1.5:1 amino hydrogens, carboxyl or anhydride group for each epoxy group to be cured. Where anhydride curing agents are used, it is often desirable to add a small amount of promotor to hasten the cure (0.1–5% by weight of the total compositions). Suitable promotors include tertiary amines such as benzyldimethylamine, octoates such as stannous and zinc octoate, alkyl sulfides, phosphines such as triphenyl phosphine, quaternary ammonium salts, etc.

The cure of the epoxides is preferably effected by mixing the curing agent with the epoxide and heating. Curing temperatures range generally from room temperature to about 200° C., the exact range depending on the curing agent selected. Active curing agents, such as the aliphatic amines may be utilized, for example, at lower temperatures, such as from room temperature to about 60° C. Less active materials, such as polybasic anhydrides and acids, generally require higher temperatures, such as temperatures ranging from about 60° C. to 150° C. Aromatic amines are preferably employed at the higher temperatures, e.g., temperatures ranging from 60° C. to 150° C.

In addition to resin products formed by curing the epoxides of this invention as set forth above, mixtures of the latter with a variety of other polyepoxides may be cured with the above described curing agents to form valuable copolymeric resins. Examples of polyepoxides which may be co-cured with these epoxides include poly(epoxyhydrocarbyl)benzene - substituted epoxides disclosed in U.S. 2,965,607, glycidyl polyethers of polyhydric phenols obtained by reacting polyhydric phenols, such as bis-phenol, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides.

The cured epoxide compositions may be used in the preparation of coating compositions, foams, pottings, castings, adhesives, impregnating compositions and the like by methods known to those skilled in the art. In such applications, other materials such as drying oils, coloring agents, fillers, preservatives, etc. may be added to the resin compositions to obtain the desired products.

The following examples are provided to illustrate the manner in which the invention is carried out. It is to be understood that the examples are given for the purpose of illustration only and the invention is not to be regarded as limited to any of the specific compounds or conditions recited therein. Unless otherwise indicated, parts disclosed in the examples are given by weight.

Example I 1-phenoxyoctadiene-2,7 was prepared by reacting 40 g. phenol in the form of sodium phenate with 30 g. butadiene in the presence of 1 g. $PdCl_2$ and 11 ml. of pyridine at 100° C. for about 25 hours. The pure product was recovered by washing the reaction mixture with benzene or methylene chloride, filtering and distilling under reduced pressure.

The phenoxyoctadiene (101 g., 0.5 mole) was stirred in 500 ml. chloroform at from 0 to 10° C. while 210 g. (1.10 mole) of 40% peracetic acid was added. After 24 hours the reaction was about 95% complete. The reaction mixture was then washed twice with 400 ml. $H_2O$, 15% sodium carbonate, $H_2O$ and dried over $MgSO_4$. The solution was concentrated on a steam bath and claisen distilled at reduced pressure. The product was identified as 1-phenoxy-2,3,7,8-diepoxyoctane and had an epoxide equivalent of 0.85 eq./100 g.

Example II 1-(2',4'-dichlorophenoxy)-octadiene-2,7 was prepared by reacting 2,4-dichlorophenol with butadiene by the procedure of Example I. The product (27 g.) was then reacted with 21 g. of 40% peracetic acid in chloroform at about 3° C. to give a mixture of 1-(2',4'-dichlorophenoxy) - 2,3 - epoxy octene and 1-(2',4'-dichlorophenoxy)-7,8-epoxy octene. The diepoxide 1-(2',4'-dichlorophenoxy)-2,3,7,8-diepoxyoctane was prepared by the same method reacting 27 g. 1-(2',4'-dichlorophenoxy)-octadiene-2,7 with twice the amount of peracetic acid (42 g.).

Example III 2,2-bis[4-(2,7-octadienyloxy)phenyl]propane was prepared by reacting 75 g. 2,2-bis(4-hydroxyphenyl)propane and 100 g. of butadiene in the presence of 1 g. $PdCl_2$ and 2 g. of sodium phenate at 100° C. The product was recovered as set forth in Example I.

The product (18 g.) was stirred with 150 ml. of chloroform at 5° C. while a solution of 0.8 g. of sodium acetate and 29.7 g. of 38% peracetic acid were added dropwise over a period of ½ hour. The reaction was allowed to continue overnight while the temperature was maintained at 5° C. and for an additional 24 hours at room temperature after which time 200 ml. of water was added and the two layers separated. The organic layer was washed with several portions of water and dried over $MgSO_4$. The solution was concentrated on a steam bath and distilled at reduced pressure. The light amber colored product was identified as 2,2-bis[4-(2,3,7,8-diepoxyoctyloxy) phenyl]propane having an epoxide equivalent of 0.74 eq./100 g.

By way of comparison, the tetraepoxide prepared above was significantly less viscous than a 2,2-bis(hydroxyphenyl)propane-epichlorohydrin reaction product having the formula

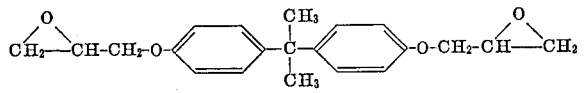

Example IV 2,2 - bis(1-phenoxy-2,3,7,8-diepoxyoctyl)propane prepared in Example II (5.0 g.) was mixed with 0.62 g. of diethylenetriamine and cured for 2 hours at 150° C. The resulting polymer had a Barcol hardness of 20-25 at 25° C. When cured for 4 hours at 150° C. the polymer had a Barcol hardness of 30-35 at 25° C.

We claim as our invention:
1. An epoxide of the formula

$$R \hspace{-2pt}-\hspace{-2pt}[O\text{—}CH_2\text{—}A\text{—}(CH_2)_3\text{—}B]_n$$

wherein R is the residue obtained by removing one or more OH— groups from a phenol
each A is

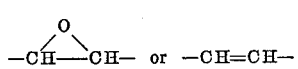

each B is

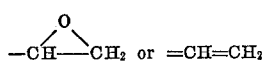

with at least one of the groups being an epoxy group and $n$ is an integer of from 1 to 4.

2. An epoxide of the formula $$R \hspace{-2pt}-\hspace{-2pt}[O\text{—}CH_2\text{—}A\text{—}(CH_2)_3\text{—}B]_n$$

wherein R is the residue obtained by removing one or more OH— groups from a phenol, said phenol having from 6 to about 24 carbon atoms.
each A is

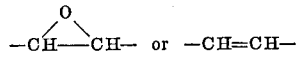

each B is

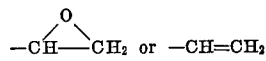

with at least one of the groups being an epoxy group and $n$ is an integer of from 1 to 4.

3. A tetraepoxide of the formula

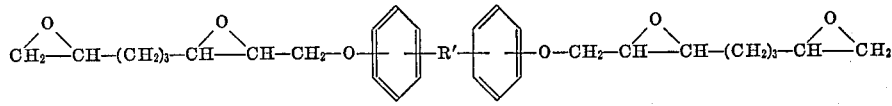

wherein R' is an alkyl of from 1 to 4 carbon atoms.
4. 1-phenoxy-2,3,7,8-diepoxyoctane.
5. 1-(2',4'dichlorophenoxy)-2,3-epoxyoctene.
6. 1-(2'',4'-dichlorophenoxy)-7,8-epoxyoctene.
7. 1-(2',4'-dichlorophenoxy)-2,3,7,8-diepoxyoctane.
8. 2,2-bis[4-(2,3,7,8-diepoxyoctoxy)phenyl]propane.
9. A product obtained by reacting an epoxide of claim 3 with an epoxy resin curing agent.

References Cited

UNITED STATES PATENTS 3,320,209   5/1967   Bremmer.

HAROLD D. ANDERSON, *Acting Primary Examiner.*

T. D. KERWIN, *Assistant Examiner.*

U.S. Cl. X.R.

260—2, 2.5, 18, 49, 78.4, 88.3, 348, 612, 613, 830; 161—184